(12) United States Patent
Yoshida

(10) Patent No.: US 8,281,825 B2
(45) Date of Patent: Oct. 9, 2012

(54) FUEL FILLER PORT CLOSING APPARATUS

(75) Inventor: Hiromitsu Yoshida, Soja (JP)

(73) Assignee: Asteer Co., Ltd., Okayama-Ken (JP)

( * ) Notice: Subject to any disclaimer, the term of this patent is extended or adjusted under 35 U.S.C. 154(b) by 665 days.

(21) Appl. No.: 12/460,417

(22) Filed: Jul. 17, 2009

(65) Prior Publication Data

US 2010/0012223 A1  Jan. 21, 2010

(30) Foreign Application Priority Data

Jul. 18, 2008 (JP) ................................ 2008-187609

(51) Int. Cl.
*B65B 1/04* (2006.01)
*B65B 3/00* (2006.01)
(52) U.S. Cl. ...................................... 141/350; 220/86.2
(58) Field of Classification Search .................. 141/350; 220/86.2
See application file for complete search history.

(56) References Cited

U.S. PATENT DOCUMENTS

| | | | |
|---|---|---|---|
| 5,322,100 A * | 6/1994 | Buechler et al. | 141/312 |
| 5,431,199 A * | 7/1995 | Benjay et al. | 141/59 |
| 5,439,129 A * | 8/1995 | Buechler | 220/86.2 |
| 5,732,840 A | 3/1998 | Foltz | |
| 5,829,495 A * | 11/1998 | Corfitsen | 141/348 |
| 6,408,903 B1 * | 6/2002 | Theuer et al. | 141/348 |
| 6,446,826 B1 | 9/2002 | Foltz et al. | |
| 7,096,899 B2 * | 8/2006 | Vetter et al. | 141/350 |
| 7,182,109 B2 * | 2/2007 | Kolberg | 141/301 |
| 7,302,977 B2 * | 12/2007 | King et al. | 141/367 |
| 7,640,954 B2 * | 1/2010 | Bar | 141/350 |
| 2010/0012224 A1 * | 1/2010 | Yoshida | 141/350 |

FOREIGN PATENT DOCUMENTS

JP  2007-331518  12/2007

* cited by examiner

*Primary Examiner* — Timothy L Maust
(74) *Attorney, Agent, or Firm* — DLA Piper LLP (US)

(57) ABSTRACT

A fuel filler port closing apparatus including an opening (44) of a filler neck or an opening (211) of a nozzle guide (21) securely and reliably sealed, even when a seal packing (325) sags, bends or deflects. Sealing is realized by a flapper (3) including a rotation plate (31) which rotates and flaps, and a seal plate (32) having the seal packing (325) moving freely in an up and down direction with respect to the rotation plate (31).

3 Claims, 8 Drawing Sheets

FUEL FILLER PORT CLOSING APPARATUS

BACKGROUND OF THE INVENTION

1. Field of the Invention

The present invention relates to a fuel filler port closing apparatus provided with a flapper for opening and closing an opening of a nozzle guide for guiding an fuel filling nozzle inserted from an opening of a filler neck (a fuel filler port), the flapper being pushed and biased upwardly by a torsion coil spring and being rotatable towards the lower side.

2. Description of the Related Art

A filler neck cap screwed into a filler neck has an advantage of being easy to ensure sealability of the filler neck. However, it has a disadvantage in that the attachment/detachment task of the filler neck cap is cumbersome. There is also a possibility that sealing may be insufficient if a screw-in operation of the cap is inappropriate or that the detached filler neck cap may get lost. Considering these problems, a fuel filler port closing apparatus provided with a flapper is proposed. Such a fuel filler port closing apparatus has the flapper which opens by rotating downwardly (towards the lower side) when pushed by the fuel filling nozzle inserted from the outside and closes by rotating upwardly (towards the upper side) when the fuel filling nozzle is removed. According to the fuel filler port closing apparatus, forgetting to tighten the filler neck cap can not occur. Further, since the filler neck cap is closed immediately before the fuel filling nozzle is inserted and is opened only when the fuel filling nozzle is inserted (i.e., during actual fuel feeding task), discharge of fuel vapor can be suppressed at minimum.

The conventional fuel filler port closing apparatus adopts a configuration of opening and closing the opening of the nozzle guide for guiding the fuel filling nozzle inserted from the opening of the filler neck with a rotatable flapper. The flapper is attached so as to be biased upwardly by being pushed by the torsion coil spring and to be rotatable downwardly by being pushed by the fuel filling nozzle. The flapper opens the opening of the nozzle guide when it is pushed by the fuel filling nozzle inserted from the opening of the filler neck and rotated downwardly. When the fuel filling nozzle is removed, the flapper rotates upwardly by the torsion coil spring thereby closing the opening of the nozzle guide. Such a fuel filler port closing apparatus has a problem in that it is difficult to realize the processing accuracy of the flapper and the opening of the nozzle guide, and the assembly accuracy of the flapper and the nozzle guide as designed. Furthermore, since the amount of deflection of the seal packing attached to the flapper varies, the necessary sealability of the filler neck may become difficult to ensure.

JP 2007-331518 discloses a fuel filler port closing apparatus in which the bias of the flapper is made sufficiently strong while reducing the spring constant of each torsion coil spring and accommodating the bending stress in time of closure within the allowable level by forming the torsion coil spring as a double configuration. The fuel filler port closing apparatus of JP 2007-331518 ensures the sealability of the filler neck by strongly pressing the seal packing attached to the flapper against the peripheral edge (valve seat) of the opening of the nozzle guide.

U.S. Pat. No. 5,732,840 and U.S. Pat. No. 6,446,826 disclose a configuration in which a bearing hole of the rotation shaft of the flapper is formed as a long hole and the flapper is pressed and moved parallel with respect to the opening of the nozzle guide. The seal packing attached to the flapper then can be reliably pressed against the peripheral edge (valve seat) of the opening of the guide to ensure the sealability of the filler neck.

The fuel filler port closing apparatus disclosed in U.S. Pat. No. 5,732,840 and U.S. Pat. No. 6,446,826 excels in that the seal packing attached to the flapper is reliably pressed against the peripheral edge (valve seat) of the opening of the nozzle guide to ensure the sealability of the filler neck by simply forming the bearing hole of the rotation shaft of the flapper as a long hole.

In other words, the fuel filler port closing apparatus disclosed in U.S. Pat. No. 5,732,840 and U.S. Pat. No. 6,446,826 change the orientation of the flapper within the range of the vertically long hole in the peripheral direction to evenly press the seal packing against the peripheral edge (valve seat) of the opening of the nozzle guide while absorbing the variation in the amount of deflection. If the seal packing can be evenly pressed against the peripheral edge (valve seat) of the guide opening in the peripheral direction, the lowering in the processing accuracy of the flapper and the opening of the nozzle guide and the assembly accuracy of the flapper and the nozzle guide can be absorbed.

However, if the bearing hole is a long hole, the flapper may not smoothly rotate. For instance, as seen from FIG. 8, in a tilted orientation in which one end of the rotation shaft 601 is positioned at the upper end edge of one bearing hole 602 and the other end of the rotation shaft 601 is at the lower end edge of the other bearing hole 602, the rotation of the flapper 603 is inhibited by the mutual friction of bearing flanges since the bearing flange 604 of the flapper that passes the rotation shaft 601 therethrough tilts with respect to the bearing flange 605 of the nozzle guide. Flapper is thought to be easily tilted by pushed on its peripheral end with the fuel filling nozzle. In the worst case, the flapper 603 might be get caught between the flanges 605 in the state illustrated in FIG. 8. Furthermore, since the torsion coil spring 606 is normally attached to the rotation shaft 601, the bearing flange 604 of the tilted flapper may inhibit the movement of the torsion coil spring 606.

SUMMARY OF THE INVENTION

The present invention aims to provide a fuel filler port closing apparatus capable of evenly and reliably pressing, in the peripheral direction, a seal packing against the peripheral edge (valve seat) of an opening of an nozzle guide without forming a bearing hole for a rotation shaft of a flapper as a long hole, which has a problem in reliability.

The above problem with the conventional fuel filler port closing apparatus is solved by a fuel filler port closing apparatus of the present invention provided with a flapper, which closes an opening of a nozzle guide by being pushed and biased upwardly by a torsion coil spring, and pushed downwardly and opened with an fuel filling nozzle inserted through an opening of a filler neck up to the opening of the nozzle guide; wherein the flapper is configured by a rotation plate which is pushed and biased upwardly by the torsion coil spring and which is rotated downwardly by being pushed with the fuel filling nozzle, and a seal plate holding a seal packing pressed against a peripheral edge of the opening of the nozzle guide; and the seal plate is coupled to an upper surface side of the rotation plate so as to be freely displaceable in an up and down direction with respect to the rotation plate.

The flapper of the fuel filler port closing apparatus of the present invention is configured by a rotation plate which is pushed and biased upwardly by the torsion coil spring and which is rotatable downwardly, and a seal plate holding a seal packing to be pressed against a peripheral edge of the opening of the nozzle guide. The flapper presses the seal packing against the peripheral edge (valve seat) of the opening of the nozzle guide while absorbing the variation of deflection by changing the orientation of the seal plate with respect to the rotation plate.

In the fuel filler port closing apparatus of the present invention, the seal plate does not tilt in an abnormal direction with respect to the peripheral edge (valve seat) of the opening of the nozzle guide since the seal plate is coupled to be freely displaceable in the up and down direction with respect to the rotation plate on the upper surface side of the rotation plate. That is, according to the present invention, the seal packing can be evenly pressed against the peripheral edge (valve seat) of the guide opening in the peripheral direction. When referring to "evenly pressing against in the peripheral direction", this does not refer to a state in which the pressing force is always even in the peripheral direction but refers to a state in which the physical contact in the peripheral direction is even and the sealability in the peripheral direction is sufficiently exhibited.

The configuration for regulating the displacement direction of the seal plate is as follows. The seal plate has a coupling projection, which has the same cross-sectional shape as a coupling hole formed in the rotation plate, projecting out from a lower surface. The coupling projection is inserted to the coupling hole from above, the coupling projection is projected out from the coupling hole with the lower surface of the seal plate surface contacted to the upper surface of the rotation plate, and an engagement portion is formed at the portion of the coupling projection at a position spaced apart from the lower surface of the rotation plate. Since the coupling hole and the coupling projection closely engage other than in the up and down direction with respect to the rotation plate, the seal plate does not tilt in an abnormal direction (lateral direction). The engagement portion formed at the coupling projection is formed, for example, by melting and solidifying the distal end of the coupling projection, as the seal plate is normally made of resin.

The torsion coil spring may engage one end to the rotation plate attached to the nozzle guide by way of the rotation shaft, and may indirectly press the seal plate against the peripheral edge (valve seat) of the opening of the nozzle guide by way of the rotation plate that is biased upwardly. However, in order to securely press the seal packing against the peripheral edge (valve seat) of the opening of the nozzle guide, the torsion coil spring preferably directly biases the seal plate. In other words, a pushing projection of the seal plate is inserted to a through-hole formed in the rotation plate from above, and the pushing projection is projected out from the lower surface. The seal plate can be directly biased by engaging the biased one end of the coil spring to the pushing projection. The seal plate is then directly biased by the torsion coil spring while having the rotating direction regulated by the rotation plate, and the seal packing can be reliably pressed against the peripheral edge (valve seat) of the guide opening.

According to the present invention, a fuel filler port closing apparatus capable of stably and reliably pressing the seal packing against the peripheral edge (valve seat) of the opening of the nozzle guide evenly in the peripheral direction is provided. This effect is obtained as the flapper of the fuel filler port closing apparatus is divided to the rotation plate and the seal plate, and the seal plate is freely displaceable only in the up and down direction with respect to the rotation plate. Furthermore, the regulation in the displacement direction of the seal plate is realized by inserting the coupling projection of the seal plate to the coupling hole of the rotation plate having the same cross-sectional shape. The seal packing can be reliably pressed against the peripheral edge (valve seat) of the guide opening by engaging one end of the torsion coil spring to the pushing projection of the seal plate projected out from the through-hole of the rotation plate.

DETAILED DESCRIPTION OF THE PREFERRED EMBODIMENTS

Figure 1:
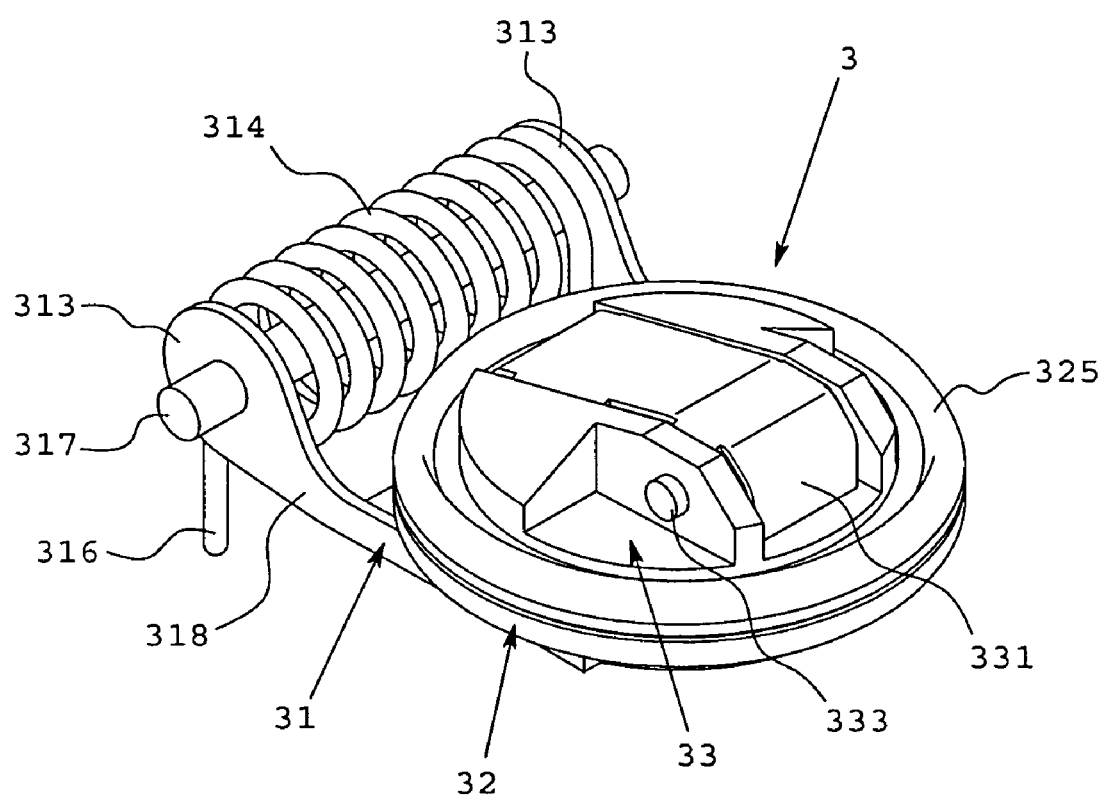
FIG. 1 is a perspective view illustrating an example of a flapper of the present invention.
Figure 2:
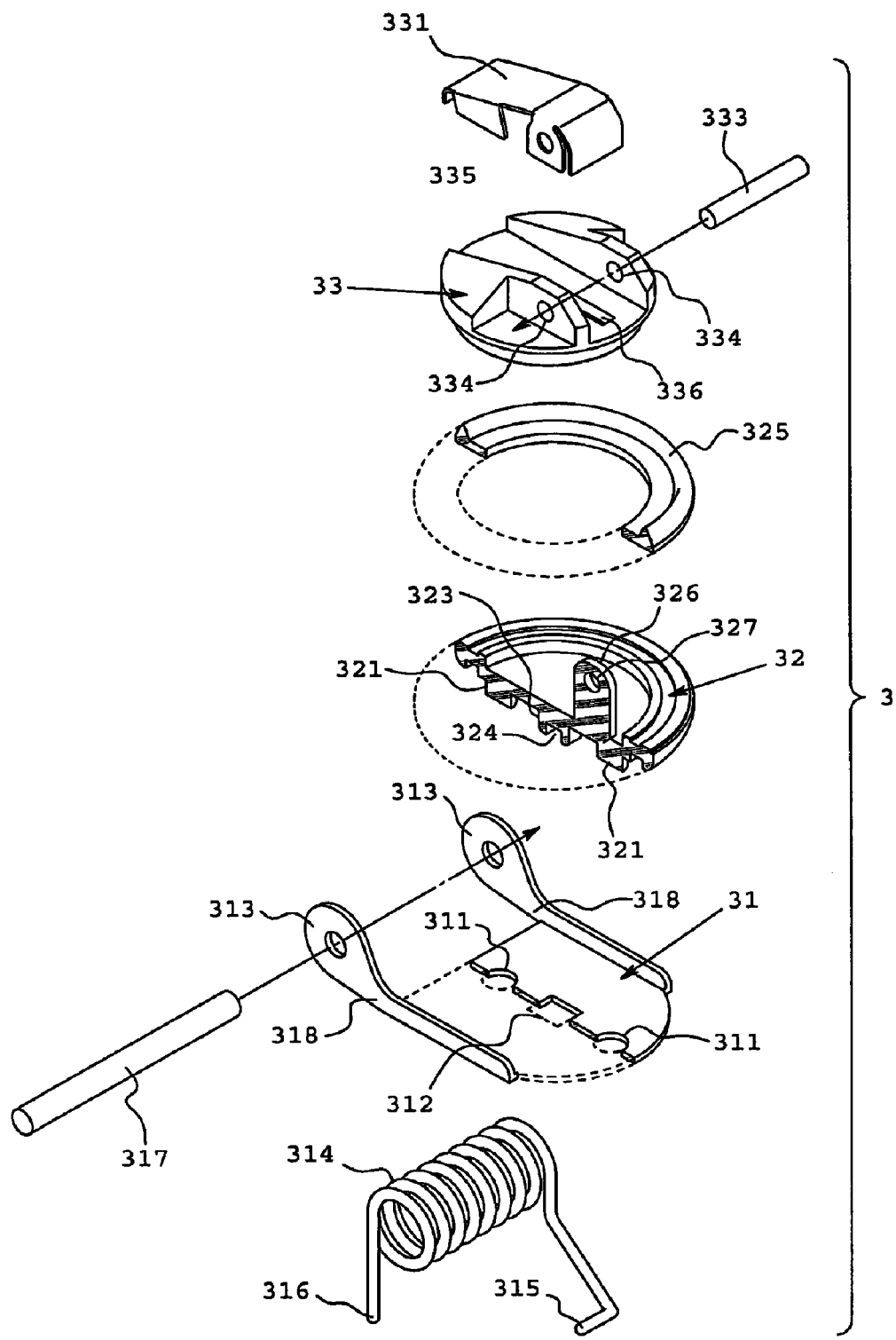
FIG. 2 is an exploded perspective view of the flapper of the present example.
Figure 3:
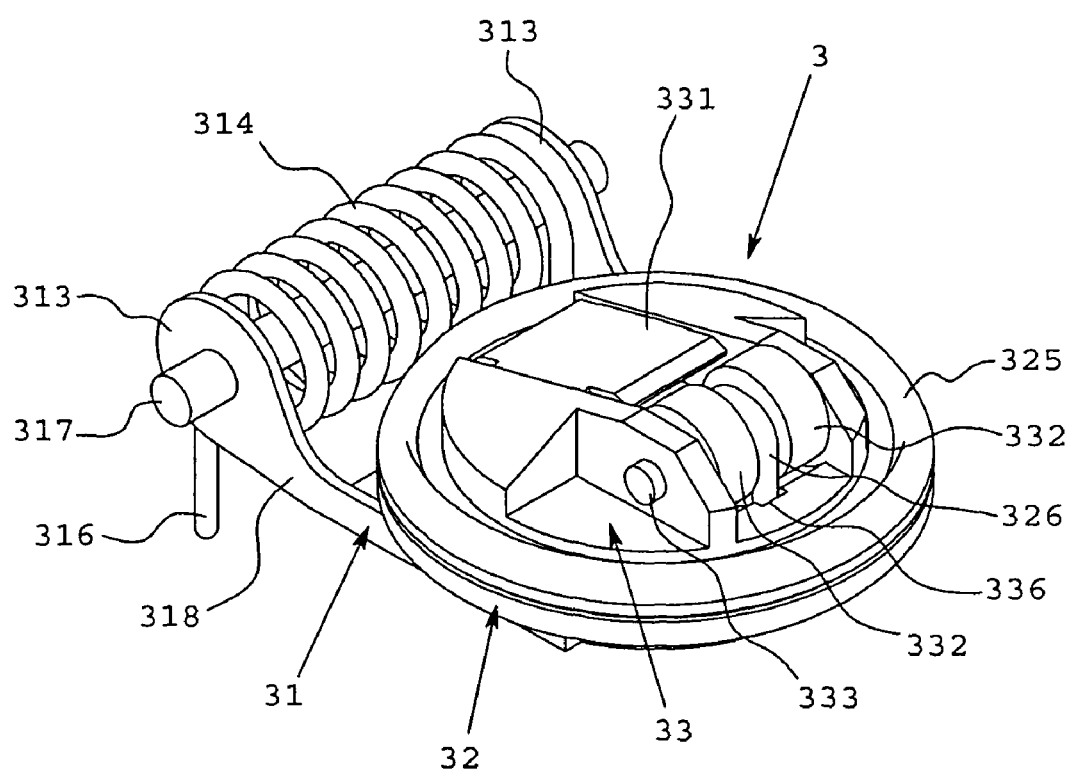
FIG. 3 is a perspective view corresponding to FIG. 1 illustrating another example of the flapper of the present invention.
Figure 4:
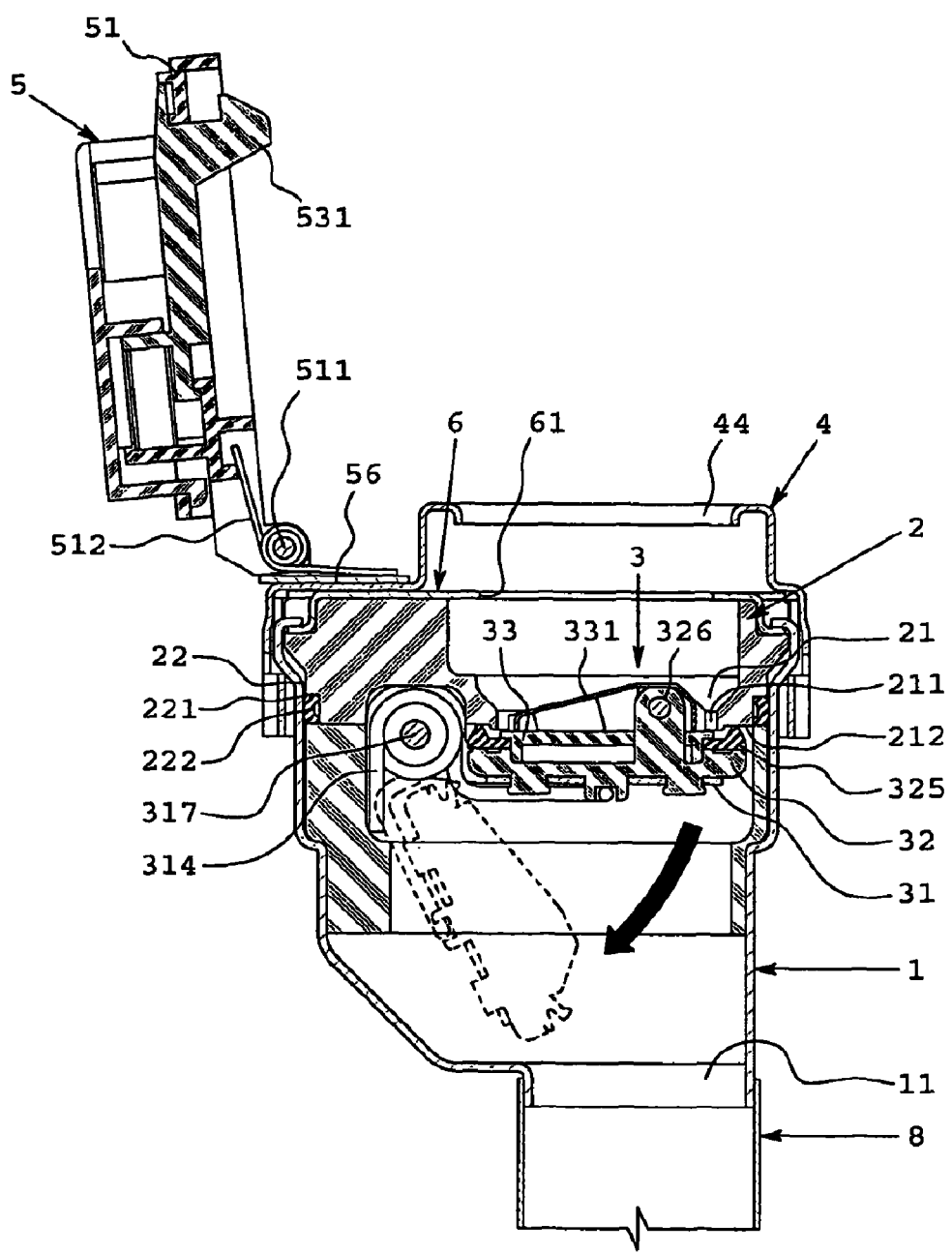
FIG. 4 is a cross-sectional view of a fuel filler port closing apparatus using the flapper of the present example.
Figure 5:
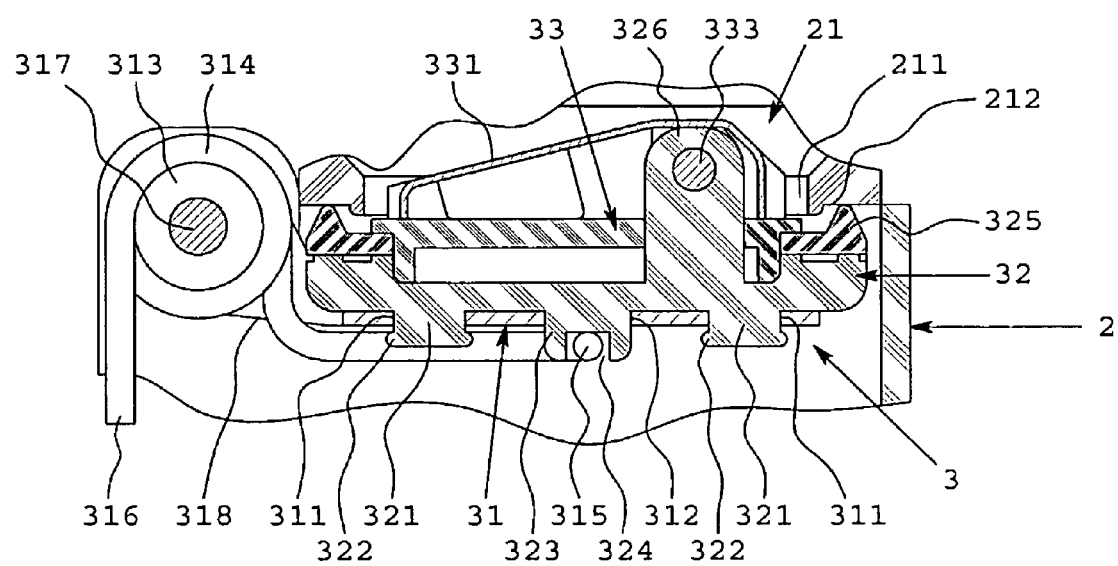
FIG. 5 is a partially enlarged cross-sectional view of the fuel filler port closing apparatus illustrating a normal state in which the flapper closes a opening of a nozzle guide.
Figure 6:
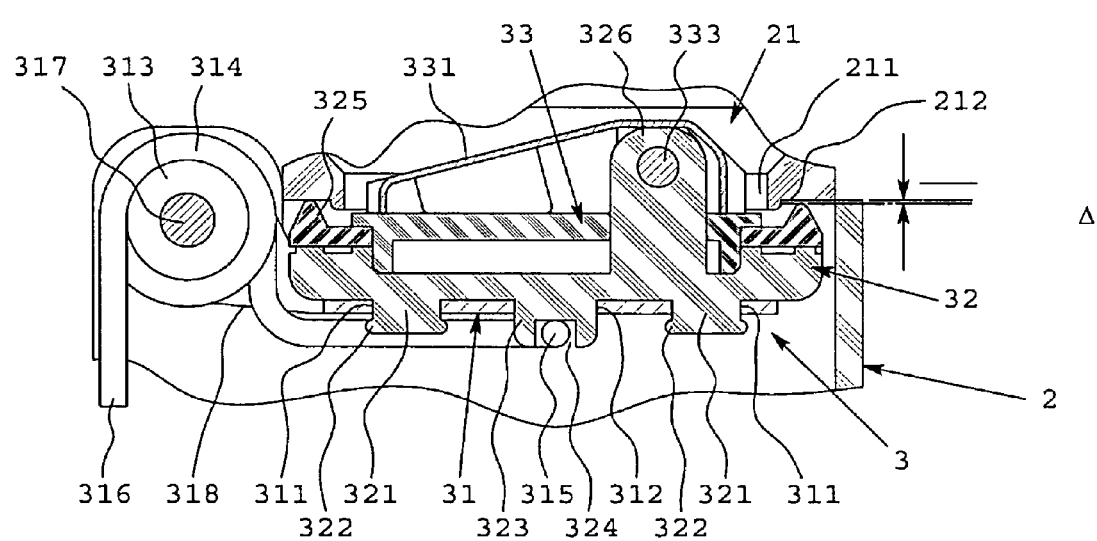
FIG. 6 is a partially enlarged cross-sectional view corresponding to FIG. 5 of the fuel filler port closing apparatus illustrating a state in which a seal packing is deflected thereby forming a gap Δ.
Figure 7:
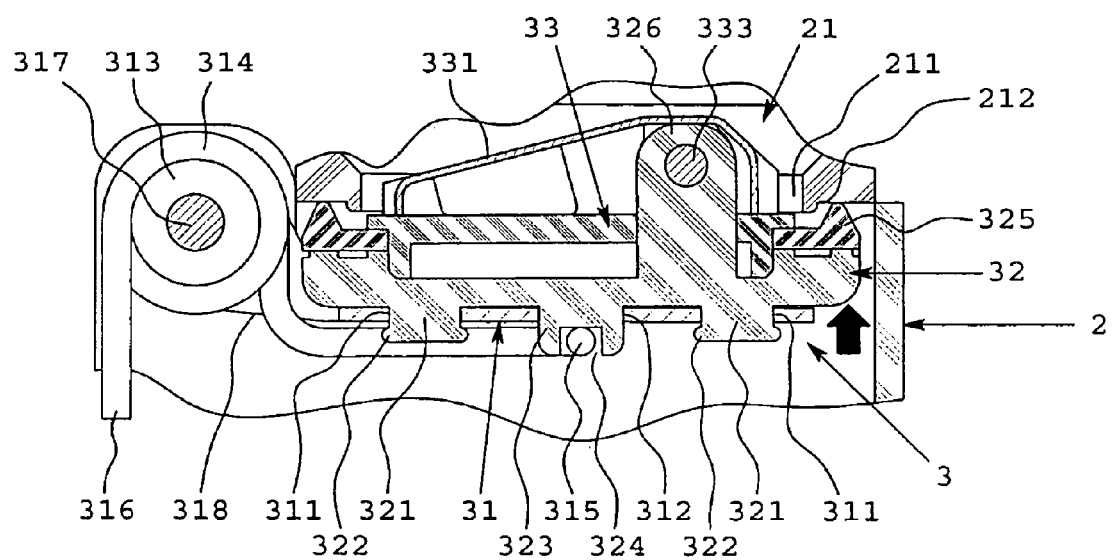
FIG. 7 is a partially enlarged cross-sectional view corresponding to FIG. 5 of the fuel filler port closing apparatus illustrating a state in which a seal plate is pushed up thereby filling the gap Δ.
Figure 8:
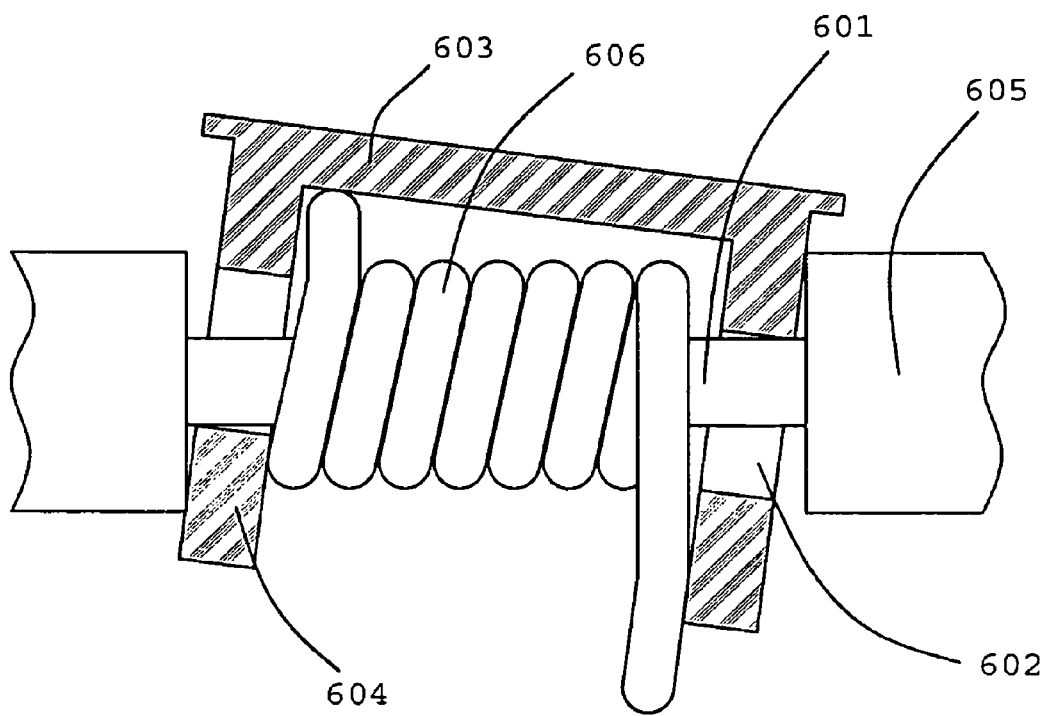
FIG. 8 is a pattern diagram illustrating a tilted flapper of a conventional fuel filler port closing apparatus.

The preferred embodiments for implementing the present invention will be described with reference to the drawings. FIG. 1 is a perspective view illustrating an example of a flapper 3. FIG. 2 is an exploded perspective view of the flapper 3 of the present example. FIG. 3 is a perspective view corresponding to FIG. 1 illustrating another example of the flapper 3 of the present invention. FIG. 4 is a cross-sectional view of a fuel filler port closing apparatus using the flapper 3 of the present example. FIG. 5 is a partially enlarged cross-sectional view of the fuel filler port closing apparatus illustrating a normal state in which the flapper 3 closes an opening 211 of a nozzle guide. FIG. 6 is a partially enlarged cross-sectional view corresponding to FIG. 5 of the fuel filler port closing apparatus illustrating a state in which a seal packing 325 is deflected thereby forming a gap Δ. FIG. 7 is a partially enlarged cross-sectional view corresponding to FIG. 5 of the fuel filler port closing apparatus illustrating a state in which a seal plate 32 is pushed up thereby filling the gap Δ. FIG. 8 is a pattern diagram illustrating the state that a flapper 603 of a prior arts tilts.

The fuel filler port closing apparatus of the present invention has a characteristic flapper 3 for opening and closing an opening 211 of a nozzle guide 21. The flapper 3 of the present example is configured by a rotation plate 31, which is pushed and biased upwardly by a torsion coil spring 314 and which is rotatable downwardly; and a seal plate 32 holding the seal packing 325 pressed against the peripheral edge of the opening 211 of the nozzle guide 21. The seal plate 32 is coupled so as to be freely displaceable in an up and down direction with respect to the rotation plate 31 on the upper surface side of the rotation plate 31 (see FIG. 4). The entire configuration of the flapper 3 is not greatly different from the conventionally known fuel filler port closing apparatus of the same type in size and in positional relationship of a rotation shaft 317 other than that the flapper 3 is divided to the rotation plate 31 and the seal plate 32. This means that the flapper 3 of the present invention can be easily applied to the conventionally known fuel filler port closing apparatus of the same type.

As illustrated in FIGS. 1 and 2, the flapper 3 of the present example is configured by the rotation plate 31, the seal plate 32, and a packing holding plate 33. The rotation plate 31 is a metal plate having a circular shape in the front and square shape in the back, formed with one-through hole 312 of square shape in plane view at the middle, and one connection hole 311 of circular shape in plane view at the front and back of the through-hole 312. The rotation plate 31 has a pair of left and right arms 318, 318 projecting out from both sides towards the back side, and the rotation shaft 317 passed through an axial-attachment plate 313 arranged at each arm 318. The torsion coil spring 314 is freely fitted to the rotation shaft 317, and is positionally-fixed by pressing a one end 316 against the inner surface of a closure unit 2 (see FIG. 4). Other end 315 of the torsion coil spring 314 is pressed against a pushing projection 323 of the seal plate 32 projecting out from the through-hole 312 of the rotation plate 31 to directly push the seal plate 32 upwardly.

The seal plate 32 is a resin plate having a circular shape in plan view for mounting the seal packing 325 having an outer diameter corresponding to the peripheral edge (valve seat) 212 of the opening 211 of the nozzle guide 21 (see FIG. 4). The seal plate 32 of the present example has the pushing projection 323, having a square cross-section equal to the planar shape of the through-hole 312, projecting out at the middle on the lower surface side. The seal plate 32 also has coupling projections 321 of circular cross-section equal to the planar shape of the coupling holes 311 projecting out from the position on the lower surface side corresponding to the coupling holes 311 with the pushing projection 323 in between. Furthermore, the seal plate 32 has an assembly flange 326 projecting out on the upper surface side. The pushing projection 323 is used to push up the seal plate 32 by the torsion coil spring 314. The coupling projections 321 are used to couple the rotation plate 31 and the seal plate 32. The assembly flange 326 is used to assemble the packing holding plate 33, a cover plate 331 (FIGS. 1 and 2), and a roller 332 (FIG. 3).

The seal plate 32 inserts the two coupling projections 321 to the two corresponding coupling holes 311 formed in the rotation plate 31, respectively, and projects the coupling projections 321 out from the coupling holes 311 with the lower surface of the seal plate 32 surface contacted to the upper surface of the rotation plate 31. The seal plate 32 can be coupled so as to be freely displaceable in the up and down direction with respect to the rotation plate 31 by arranging an engagement portion 322 at the portion of the coupling projection 321 at the position spaced apart from the lower surface of the rotation plate 31. The engagement portion 322 is formed by melting and solidifying the distal end of the coupling projection 321. The coupling projection 321 has the same cross-sectional shape (circular cross-section) as the coupling hole 311, and thus the coupling hole 311 and the coupling projection 321 closely engage other than in the up and down direction with respect to the rotation plate 31, and do not tilt in an abnormal direction. The seal plate 32 thus displaces only in the up and down direction with respect to the rotation plate 31 within a range in which the engagement portion 322 engages the lower surface of the rotation plate 31, and fills the gap Δ formed between the valve sheet and the seal packing 325.

In the flapper 3 of the present invention, the rotation plate 31 follows a motion of the seal plate 32 by the engagement of the coupling hole 311 the coupling projection 321 pushed up by the torsion coil spring 314. Specifically, the seal plate 32 projects the pushing projection 323 of square cross section out at the middle of the lower surface, and engages one end 315 of the torsion coil spring 314 in an engagement groove 324 extending in the left and right direction formed at the distal end. Therefore, the rotation plate 31 functions only as a member for displacing the seal plate 32 that actually opens and closes the opening 211 of the nozzle guide along a circular arc path having the rotation shaft 317 as the center.

The seal packing 325 is a circular ring elastic material made of rubber having a protrusion of triangular cross-section on the outer periphery. The seal packing 325 is sandwiched and held by a peripheral edge portion of the upper surface of the seal plate 32 and the lower surface of the packing holding plate 33 to be connected to the seal plate 32. Specifically, the seal packing 325 is mounted on two concentric supporting protrusions formed at the peripheral edge portion of the upper surface of the seal plate 32. The cylindrical main body of the packing holding plate 33 is then fitted to the inner peripheral edge of the seal packing 325, and the seal packing 325 is held with the lower surface of the radially and outwardly projecting flange of the holding plate 33 (see FIG. 5 and subsequent figures).

The holding plate 33 is coupled to the seal plate 32 by projecting the assembly flange 326 of the seal plate 32 out from an assembly hole 336 of the holding plate 33, communicating an attachment hole 327 of the assembly flange 326 and coupling holes 334 of the holding plate 33 and inserting a coupling pin 333. The holding plate 33 of the present example includes a metal cover plate 331 having a hill-shaped cross-section at the middle of the upper surface. The cover plate 331 prevents the fuel filling nozzle (not shown) from getting caught at the flapper 3 when pulling out the fuel filling nozzle (not shown) having the side surface contacted to the push-opened flapper 3. The cover plate 331 protects the holding plate 33 made of resin. The cover plate 331 of the present example is fixed by communicating the attachment hole 327 of the assembly flange 326, the coupling holes 334 and the attachment hole 335 of the holding plate 33 and inserting the coupling pin 333.

In order to prevent the fuel filling nozzle being pulled out from being caught at the flapper 3, a roller 332 may be attached to the holding plate 33 in addition to the cover plate 331, as illustrated in FIG. 3. The roller 332 of another example is attached to the holding plate 33 by communicating the assembly hole of the assembly flange 326, the coupling hole 334 of the holding plate 33, and a roller shaft hole (not shown), and inserting the coupling pin 333. The cover plate 331 is positionally fixed by inserting the coupling pin 333 to an assembly piece (not shown) extended between the assembly flange 326 and the roller 332. When a finger (not shown) is caught at the opening 211 of the nozzle guide by mistake, the roller 332 added to the cover plate 331 allows the finger to be easily removed.

The overall configuration of the fuel filler port closing apparatus assembled with the flapper 3 of the present invention will be described hereinafter. As shown in FIG. 4, the fuel filler port closing apparatus of the present example is configured by a filler neck 1, a closure unit 2, and a cover unit 4. The closure unit 2 is attached with the flapper 3, which is pushed down by the fuel filling nozzle (not shown) inserted from the opening 44 of the filler neck of the cover unit 4 thereby opening the opening 211 of the nozzle guide. An upwardly rotatable cover 5 is attached to the cover unit 4, where the opening 44 of the filler neck is opened and closed by the cover 5. The cover unit 4 is also fixed with an attachment plate 56 attached with a rotation shaft 511 of a cover main body 51.

The filler neck 1 is a tubular member made of metal in which an opening at the upper end is wide and a connection port 11, which is an opening at the lower end, narrows in accordance with a fuel feeding tube main body 8 to be connected. The filler neck 1 of the present example is a separate body from the fuel feeding tube main body 8, but the end of the fuel feeding tube main body 8 may be enlarged to configure the filler neck 1. The closure unit 2 is a resin block formed with the nozzle guide 21 for guiding the fuel filling nozzle (not shown) inserted from the opening 44 of the filler neck. The flapper 3 for opening and closing the opening 211 is integrally assembled to the closure unit 2. A ring-shaped fit-in groove 221 is formed at a peripheral surface 22 of the closure unit 2 of the present example. A seal ring 222 is fitted into the ring-shaped fit-in groove 221 to ensure the sealability when the closure unit 2 is fitted into the filler neck 1.

The cover 5 opens and closes the opening 44 of the filler neck positioned at the upper stage of the opening 211 of the nozzle guide to prevent rainwater and dust from accumulating at the opening 211 of the nozzle guide. The cover main body 51 of the cover 5 of the present example is attached to the rotation shaft 511 supported by the attachment plate 56. The cover main body 51 is biased in an opening direction by the torsion coil spring 512, and maintains the opening 44 in the closed state by engaging a latch 531 provided on the cover main body 51 to the opening 44 of the filler neck. Furthermore, the fuel filler port closing apparatus of the present example has a spacer 6 interposed between the closure unit 2 and the cover unit 4. The spacer 6 is formed with an opening 61 for fixing the inserted nozzle. The opening 61 is one size smaller than the opening at the upper end of the nozzle guide 21 to engage and hold the inserted fuel filling nozzle.

As illustrated in FIG. 5, according to the flapper 3 of the present invention, the seal plate 32 pushed up by the torsion coil spring 314 closes the opening 211 of the nozzle guide by evenly pressing the seal packing 325 against the peripheral edge (valve seat) 212 of the opening 211 in the peripheral direction. The seal packing 325 is pressed against the peripheral edge (valve seat) 212 of the opening 211 by the seal plate 32. The seal plate 32 is directly pushed up by the one end 315 of the torsion coil spring 314. As long as the seal packing 325 does not deflect, the seal packing 325 is evenly pressed against the peripheral edge (valve seat) 212 of the opening 211 in the peripheral direction even if the rotation plate 31 is tilted, whereby reliable sealability is achieved.

However, when the seal packing 325 is deflected thereby forming a gap Δ at one part, as illustrated in FIG. 6, the seal plate 32 is pushed up in a range where the engagement portion 322 of the coupling projection 321 engages the lower surface of the rotation plate 31. As a result, the seal packing 325 is again evenly pressed against the peripheral edge (valve seat) 212 of the opening 211 of the nozzle guide, as illustrated in FIG. 7, whereby reliable sealability is achieved.

The flapper 3 of the present invention allows the seal plate 32 holding the seal packing 325 to be displaceable only in the up and down direction with respect to the rotation plate 31. Therefore, even if the gap Δ is formed, the sealability is not affected as the seal plate 32 tilts and deforms the seal packing 325. The flapper 3 of the present invention thus suppresses the formation of the gap Δ, and exhibits stable and reliable sealability.

EXAMPLES

In order to assess an effect of the present invention, a sealability of a fuel filler port closing apparatus equipped with the flapper of the present invention and that of a fuel filler port closing apparatus equipped with a conventional flapper (hereinafter referred to as a "comparison") were measured. As the comparison, the fuel filler port closing apparatus having a flapper made of a single plate and a long bearing hole for a rotation shaft of the flapper was used. Configuration of the present invention and the comparison was summarized in table 1.

TABLE 1

|  | Present invention | Comparison |
|---|---|---|
| Diameter of the seal packing (mm) | 31 | 31 |
| Spring load (N) | 12 | 12 |
| Shape of bearing hole | Circle | Vertically long |

The connection port 11 of the fuel filler port closing apparatuses of present invention and comparison were connected to a suction pump and were aspirated. The pressure (kPa) at which the amount of gas leak (cc) per minute reached to 3 cc/min were measured. The measurement was conducted plural times. The results were summarized in the table 2. According to the present invention the pressure were around −10 kPa to −12 kPa and were stable. Contrast to this, according to the comparison, the pressure were unstable and gas leaking began around −3 kPa to −5 kPa.

TABLE 2

|  | Present Invention | Comparison |
|---|---|---|
| Pressure (kPa) | −10 to −12 | −3 to −5 |

What is claimed is:

1. A fuel filler port closing apparatus provided with a flapper, which closes an opening of a nozzle guide by being pushed and biased upwardly by a torsion coil spring, and pushed and opened with a fuel filling nozzle inserted through an opening of a filler neck up to the opening of the nozzle guide, wherein
the flapper is configured by a rotation plate which is pushed and biased upwardly by the torsion coil spring and which is rotated downwardly by being pushed with the fuel filling nozzle, and a seal plate holding a seal packing pressed against a peripheral edge of the opening of the nozzle guide;
the seal plate is coupled to an upper surface side of the rotation plate so as to be freely displaceable in an up and down direction with respect to the rotation plate,
the seal plate includes a coupling projection which projects to the lower side;
the rotation plate includes a coupling hole to which the coupling projection is inserted from above;
the coupling projection and the coupling hole have the same cross-sectional shape; and
the coupling projection has a length of projecting out from the coupling hole in a state where the coupling projection is inserted to the coupling hole and the upper surface of the rotation plate and a lower surface of the seal plate are surface contacted, and is arranged with an engagement portion at a portion spaced apart from the lower surface of the rotation plate.

2. A fuel filler port closing apparatus provided with a flapper, which closes an opening of a nozzle guide by being pushed and biased upwardly by a torsion coil spring, and pushed and opened with a fuel filling nozzle inserted through an opening of a filler neck up to the opening of the nozzle guide, wherein the flapper is configured by a rotation plate which is pushed and biased upwardly by the torsion coil spring and which is rotated downwardly by being pushed with the fuel filling nozzle, and a seal plate holding a seal packing pressed against a peripheral edge of the opening of the nozzle guide;

the seal plate is coupled to an upper surface side of the rotation plate so as to be freely displaceable in an up and down direction with respect to the rotation plate, the seal plate includes a pushing projection which projects to the lower side;

the rotation plate includes a through-hole to which the pushing projection is inserted from above;

the pushed projection is inserted to the through-hole, and projects out from a lower surface of the rotation plate; and the torsion coil spring has a biased one end engaged to a portion of the pushed projection projecting out from the lower surface of the rotation plate.

3. A fuel filler port closing apparatus provided with a flapper, which closes an opening of a nozzle guide by being pushed and biased upwardly by a torsion coil spring, and pushed and opened with a fuel filling nozzle inserted through an opening of a filler neck up to the opening of the nozzle guide, wherein the flapper is configured by a rotation plate which is pushed and biased upwardly by the torsion coil spring and which is rotated downwardly by being pushed with the fuel filling nozzle, and a seal plate holding a seal packing pressed against a peripheral edge of the opening of the nozzle guide;

the seal plate is coupled to an upper surface side of the rotation plate so as to be freely displaceable in an up and down direction with respect to the rotation plate, the seal plate includes a pushing projection which projects to the lower side;

the rotation plate includes a through-hole to which the pushing projection is inserted from above;

the pushed projection is inserted to the through-hole, and projects out from a lower surface of the rotation plate;

the torsion coil spring has a biased one end engaged to a portion of the pushed projection projecting out from the lower surface of the rotation plate;

the seal plate further includes a coupling projection which projects to the lower side;

the rotation plate further includes a coupling hole to which the coupling projection is inserted from above;

the coupling projection and the coupling hole have the same cross-sectional shape; and the coupling projection has a length of projecting out from the coupling hole in a state where the coupling projection is inserted to the coupling hole and the upper surface of the rotation plate and a lower surface of the seal plate are surface contacted, and is arranged with an engagement portion at a portion spaced apart from the lower surface of the rotation plate.

\* \* \* \* \*